United States Patent [19]
Boveia

[11] 3,984,120
[45] Oct. 5, 1976

[54] AUTO TOWING APPARATUS

[76] Inventor: Clark E. Boveia, 1308 Gray St., Benton, Ark. 72015

[22] Filed: June 18, 1975

[21] Appl. No.: 586,912

[52] U.S. Cl. ............................ 280/402; 214/86 A; 280/479 A
[51] Int. Cl.² ......................................... B60P 3/12
[58] Field of Search ............ 280/402, 405 R, 406 A, 280/456 R, 479 R, 479 A, 480, 490 R, 490 A; 214/86 A

[56] References Cited
UNITED STATES PATENTS

| | | | |
|---|---|---|---|
| 2,189,393 | 2/1940 | Fried | 280/402 X |
| 2,701,069 | 2/1955 | Hawkins | 280/402 X |
| 3,610,447 | 10/1971 | Ortiz | 280/480 X |
| 3,649,046 | 3/1972 | Mathisen | 280/490 R X |
| 3,664,686 | 5/1972 | Anderson | 280/490 R |
| 3,690,482 | 9/1972 | Gaumont | 280/402 X |
| 3,871,535 | 3/1975 | Fenske | 280/479 A X |
| 3,885,815 | 5/1975 | Kniff | 280/402 |

*Primary Examiner*—M. H. Wood, Jr.
*Assistant Examiner*—R. Schrecengost
*Attorney, Agent, or Firm*—Raymond N. Matson

[57] ABSTRACT

An auto towing apparatus including an A-frame attachable to an auto for lifting and supporting a pair of the wheels thereof and having a socket for engaging a novel hitch ball and hoist combination on a towing vehicle, the hoist eliminating the need for precisely positioning the ball under the hitch socket.

6 Claims, 7 Drawing Figures

U.S. Patent   Oct. 5, 1976   Sheet 2 of 2   3,984,120
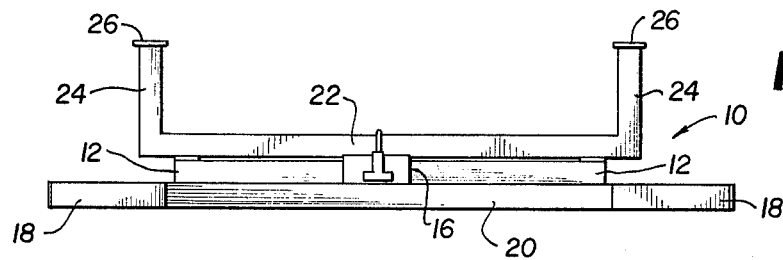
FIG.4
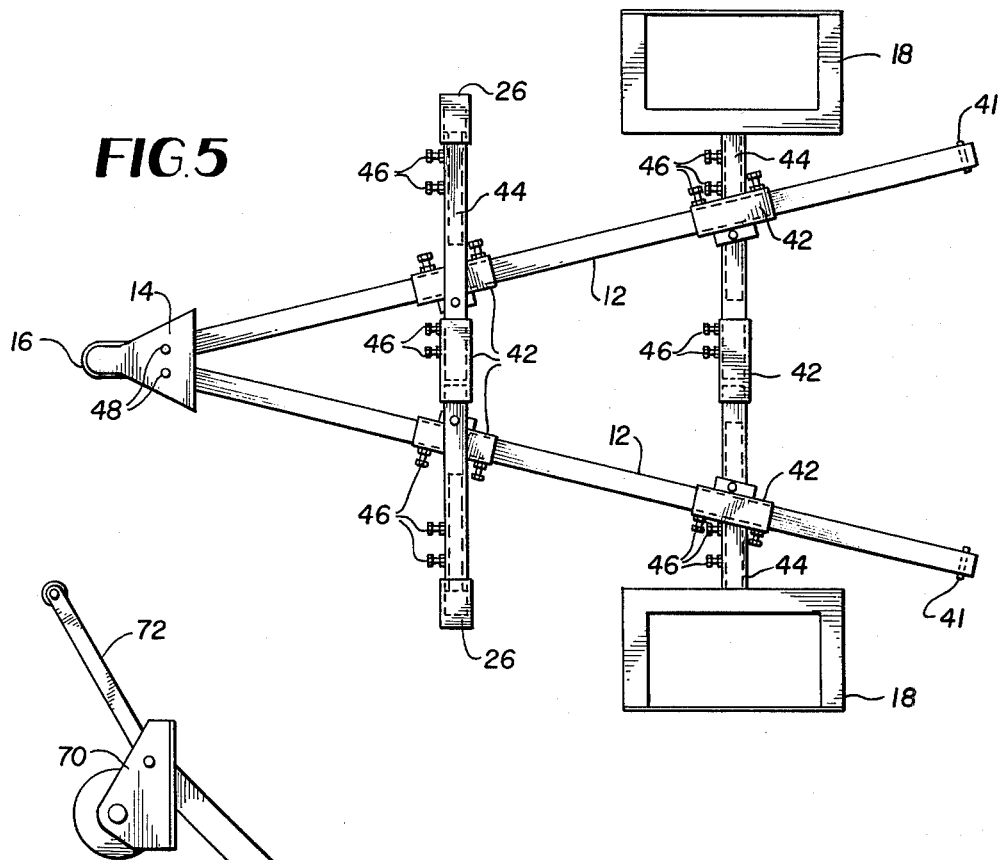
FIG.5
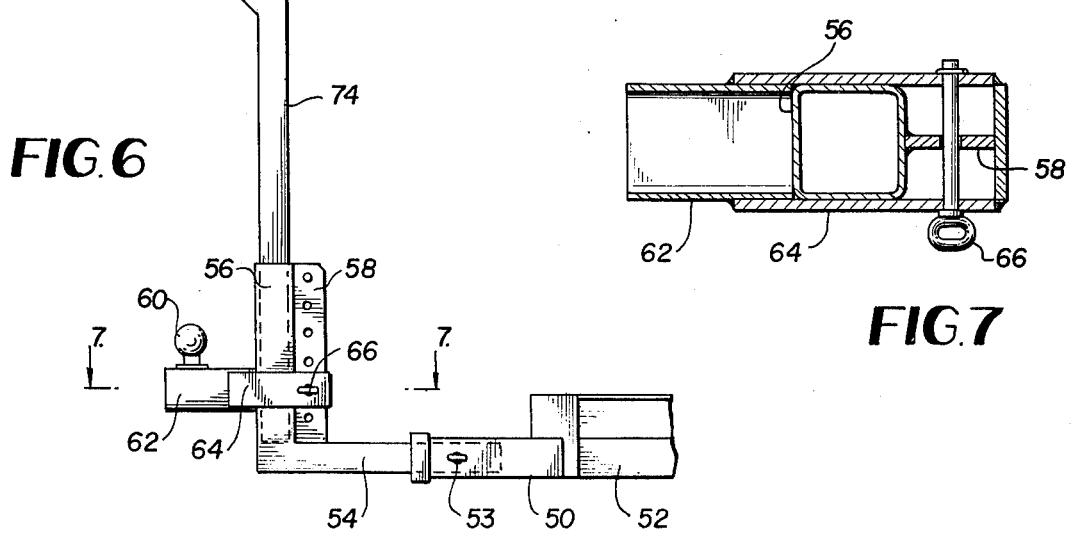
FIG.6
FIG.7

AUTO TOWING APPARATUS

This invention relates generally to auto towing apparatus, and more particularly to a novel towing system comprising only three cooperating and basic components.

Towing apparatus of various types are well known in the art and many of these are characterized by a number of objectionable features. Among these are an unsightliness when positioned on the rear of a private auto; the need for more than one operator to connect the hitch ball and socket; the need to position the hitch ball directly under the socket when connecting the two which is very difficult for the average driver; and an unwieldy and cumbersome structure making it impractical in use.

Accordingly, the main object of the present invention is to provide an improved auto towing apparatus which will obviate the above and other objectionable features characterizing known structures.

An important object of the present invention is to provide a novel towing apparatus which can easily and rapidly be installed or removed in about two minutes by a single person.

Another important object of the present invention is to enable a mobile home owner or renter to carry a small car along with him for ready use at any destination or stop.

A further important object of the present invention is to provide an improved auto towing apparatus which may be tailor-made for a given auto or adjustable so as to be usable with various makes of small cars.

A still further important object of the present invention is to provide a hitch in which the hitch ball need only be positioned within feet of the socket in order that a hitch connection can be made.

Another object of the present invention is to provide an improved towing apparatus which features a hitch ball and hoist combination which so cooperates with the supporting frame of and the car to be towed as to completely simplify the connection or disconnection of the towing or towed vehicles.

Other objects and advantages of the present invention will become apparent during the course of the following description.

In the drawings, I have shown two embodiments of the invention. In these showings:

FIG. 4 is a front elevational view of the A-frame;

FIG. 5 is a top plan view of an adjustable A-frame which can fit a plurality of different cars, parts being omitted for clarity;

FIG. 6 is a side elevational view of the novel ball hitch and hoist combination; and FIG. 7 is a horizontal sectional view taken on the line 7—7 of FIG. 6.

Figure 1:
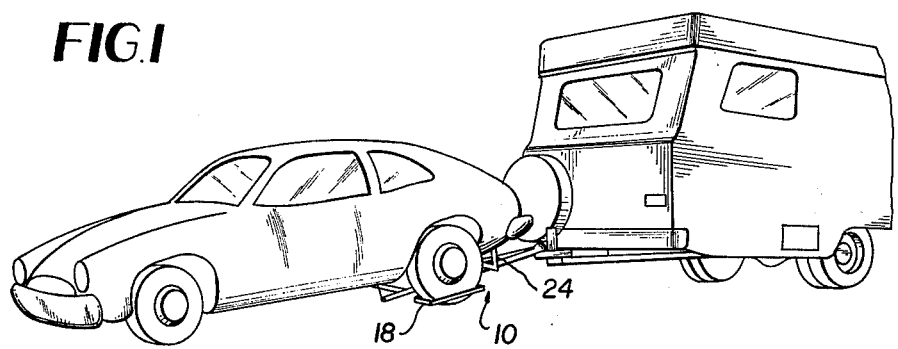
FIG. 1 is a perspective view of the invention showing how it permits the lifting from the ground of two wheels of the towed vehicle by the towing motor home, etc.

Referring to the drawings, numeral 10 designates the A-frame as a whole which is formed of strong tubular steel and the two legs 12 thereof are rigidly joined at their apex by a steel plate 14 which terminates in a downwardly facing hitch socket 16 for connection with a hitch ball.

Figure 2:
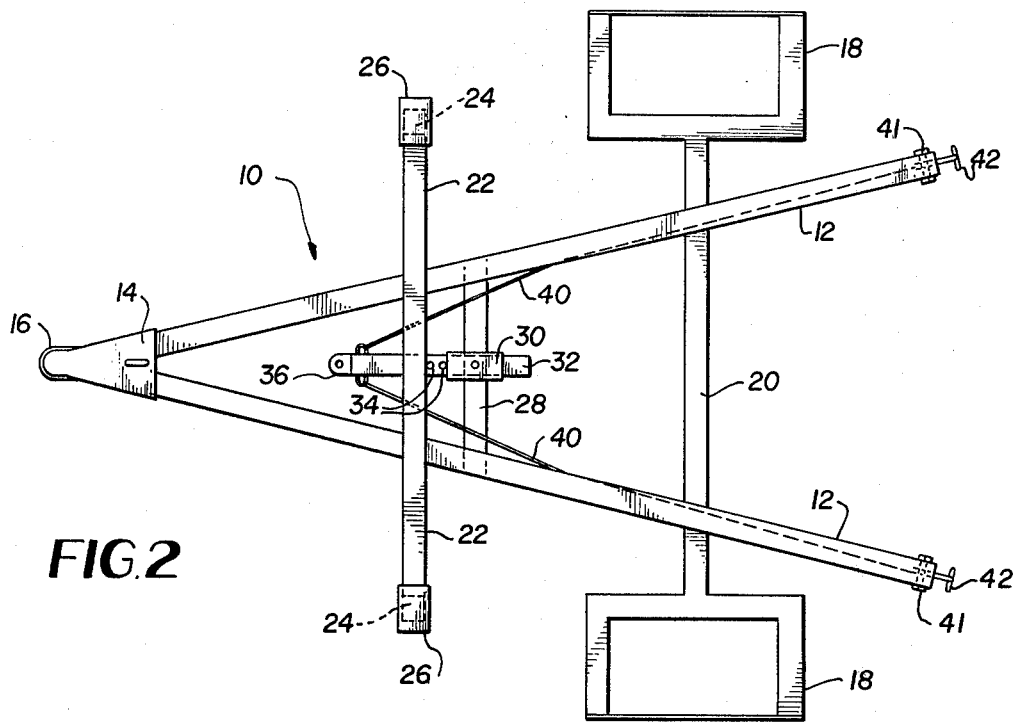
FIG. 2 is a top plan view of the A-frame of the invention which includes a hitch socket at its apex.
Figure 3:
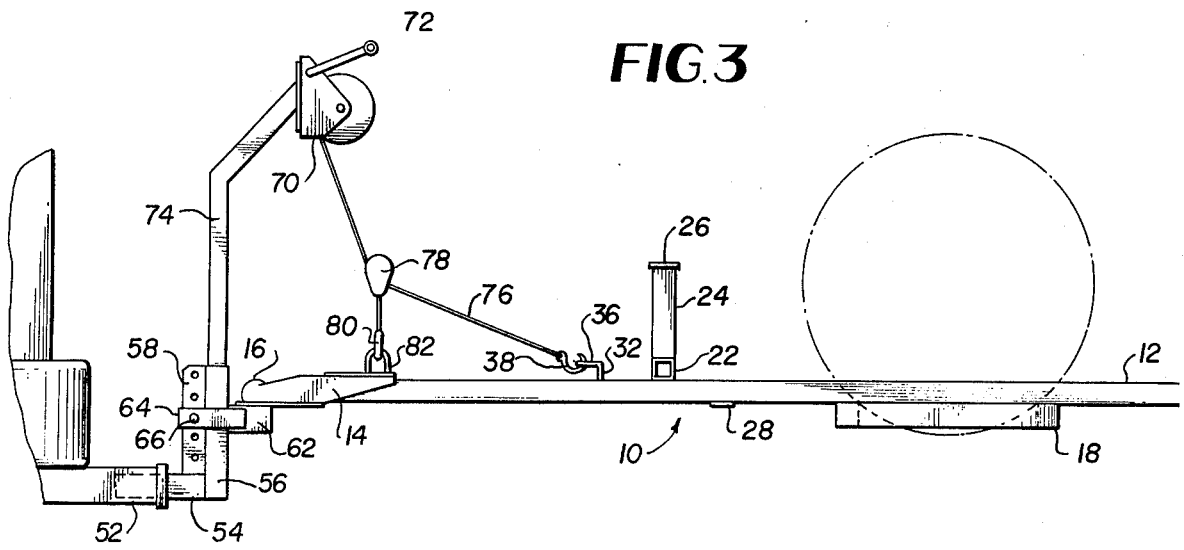
FIG. 3 is a side elevational view thereof showing it with the novel hitch ball and hoist combination of the invention.

As seen in FIGS. 2 and 3, a pair of rectangular frame wheel supports 18 are mounted at the ends of a frame member 20 which is fixed to the bottom of the A-frame 10 to thus strongly brace it. Intermediate it and the apex plate 14, and rigidly fixed to the legs 12, is a second bracing member 22 which terminates at each end (FIGS. 2, 4 and 5) in an upstanding support 24 which terminates in leaf-spring or chassis engaging and supporting cap plates 26 which are adjustable in height.

As is clearly shown in FIG. 2, the A-frame 10 is also provided with an intermediate leg connecting member 28 upon which an apertured tubular guide 30 is rigidly mounted for the reception of a slide bar 32 having locking apertures 34 and an upstanding apertured forward end 36 for the reception of a hook 38 of the hoist to be described. A pair of cables 40 are connected to the slide bar 32 and each passes rearwardly through one of the A-frame legs 12 and over a pulley 41 to terminate in an auto frame engaging hook 42. In operation, these hooks each engage the existing chassis opening or handle on each side of the auto frame (not shown) which is used by the manufacturer for tie-down during initial vehicle shipment.

The universal A-frame disclosed in FIG. 5 is identical in all respects with that disclosed in FIG. 2 with the exception that it is adjustable so as to fit a maximum number of different small sized cars. Such adjustments are readily effected by the use of sleeves 42 and telescoping members 44 which are readily secured in the adjusted positions by lock screws 46. The apertured tubular guide 30 for the locking slide bar 32 is fixed to the transverse sleeve 42 between the cap plates 26 while the A-frame legs 12 are pivoted as at 48 to the apex plate 14.

As seen in FIG. 6, a conventional tow-bar socket 50 is rigidly fixed to the bumper or frame 52 of the towing vehicle. Into the two-bar socket is inserted a draw-bar tube 54 which terminates in an upstanding, hoist bar receiving tube 56 to the side of which, an apertured bracket 58 is fixed. The hitch ball 60 is fixed to an extension 62 of an apertured collar 64 which encircles the tube and bracket 56, 58 to adjust the height of the ball. At the proper height, a pin 66 is inserted through the aligned aperture in the bracket 58 where it is retained by suitable means such as a clip engaging opposed sides of a groove in the pin. The draw-bar tube 54 is detachably mounted in socket 50 by a pin 53.

A hoist 70 operated by a crank 72 is mounted on a bar 74 which fits readily into the tube 56. The hoist cable 76 which terminates in the hook 38 also carries a free pulley 78 to which a second hook 80 is rigidly attached (FIG. 3) and is adapted to engage an eye 82 fixed to the apex plate 14.

OPERATION

It is believed to be apparent that the towing apparatus herein described and disclosed is as practical and simple as is possible to design. While either the front or rear wheels can be supported off the ground during the towing operation, it is preferable to two the smaller car backwardly with the rear wheels off the ground. Thus, cars with automatic transmissions are towed with better control, ease and safety, and no mileage is registered on the speedometer.

The A-frame 10 is placed flush on the ground behind the towing vehicle which may be a mobile home as shown in FIG. 1. The small car to be towed is then backed up so as to place its rear wheels in the rectangular frame wheel supports 18 (FIGS. 2, 3 and 5). The hoist bar 74 is then placed in the tube 56 and the cable hooks 80 and 38 are respectively connected to the eye 82 in the apex plate 14 and to the apertured forward end 36 of the slide locking bar 32.

The hooks 42 on the ends of the cables 40 are now connected with the frame slots or handles (not shown) provided by the manufacturer just forward of the rear wheels and the winch 70 is now operated by its crank 72 to move the slide locking bar 32 to the left (FIGS. 2 and 3) to tighten the cables 40 and hence the grip of the hooks 42 on the vehicle frame.

When the cables 40 are taut, a locking pin is inserted through the apertured guide 30 and an aperture 34 of the bar 32 to retain the latter in its position. The winch 70 is now backed off slightly and the hook 38 disconnected from the bar 32 and hooked onto the winch housing. This now creates a direct lifting effect by the hook 80 on the left end of the frame 10 to raise the same and swing it and its hitch socket 16 toward the hitch ball 60 mounted on the hoist bar 74 receiving tube 56. With a little guiding, the mating of the ball and socket is readily effected and they are then locked together. It will be appreciated that during the elevation of the frame that the cap plates 26 will engage and support either the leaf springs or an appropriate part of the chassis of the towed vehicle.

It is to be understood that the forms of my invention herewith shown and described are to be taken as preferred examples of the same and that various changes in the shape, size and arrangement of parts may be resorted to without departure from the spirit of the invention or the scope of the subjoined claims.

What is claimed is:

1. In an automobile vehicle towing apparatus, the combination comprising an A-frame having means at one end for attaching it to a vehicle to be towed, and hitch means at its other end; a towing vehicle having hitch means; and a hoist for lifting said other end of said A-frame off the ground and mating said hitch means on said frame and on said towing vehicle so as to tow said vehicle to be towed with one of its ends off the ground; said hoist being mounted in the hitch means of said towing vehicle and being detachable therefrom.

2. The combination recited in claim 1 wherein said attaching means comprises a pair of cables terminating in hooks for attachment to the frame of the vehicle to be towed.

3. The combination recited in claim 1 wherein said towing vehicle hitch means is adjustable in height.

4. The combination recited in claim 1 wherein said A-frame is adjustable to fit different sized vehicles.

5. A towing apparatus comprising, in combination, a frame for lifting and supporting one pair of wheels of a vehicle to be towed; said frame having one end attachable to the towed vehicle and the other end having one member of a trailer hitch; a mating trailer hitch member fixed to a towing vehicle; and a hoist mounted on said mating member for lifting said other end of said frame to mate said hitch members; said mating trailer hitch member comprising a two-bar socket fixed to said towing vehicle; a drawbar tube detachably inserted in said socket, and having an upturned portion to receive a hoist supporting bar, an apertured bracket fixed to said upturned portion, a collar encircling said upturned tube and bracket, and a hitch member fixed to said collar.

6. An auto lifting and towing apparatus comprising a towbar socket fixed to a towing vehicle; a draw-bar tube detachably inserted in said socket and having an upturned portion to receive a hoist supporting bar; a hoist supporting bar mounted in said portion; an apertured bracket fixed to said portion; a collar encircling said upturned portion and bracket; and a hitch member fixed to said collar.

* * * * *